US012766484B2

(12) United States Patent
Li et al.

(10) Patent No.: US 12,766,484 B2
(45) Date of Patent: Oct. 20, 2026

(54) LAYERED MULTI-METAL-OXIDE-BASED MAGNETIC BIOCHAR AND PREPARATION METHOD AND USE THEREOF

(71) Applicant: Institute of Environmentand Sustainable Development in Agriculture, Chinese Academy of Agricultural Sciences, Beijing (CN)

(72) Inventors: Lianfang Li, Beijing (CN); Peng Lyu, Beijing (CN)

(73) Assignee: Institute of Environmentand Sustainable Development in Agriculture, Chinese Academy of Agricultural, Beijing (CN)

( * ) Notice: Subject to any disclaimer, the term of this patent is extended or adjusted under 35 U.S.C. 154(b) by 203 days.

(21) Appl. No.: 18/531,700

(22) Filed: Dec. 7, 2023

(65) Prior Publication Data

US 2025/0065299 A1 Feb. 27, 2025

(30) Foreign Application Priority Data

Aug. 23, 2023 (CN) ......................... 202311067728.1

(51) Int. Cl.

| | |
|---|---|
| ***B01J 20/20*** | (2006.01) |
| ***B01J 20/08*** | (2006.01) |
| ***B01J 20/28*** | (2006.01) |
| ***B01J 20/30*** | (2006.01) |
| ***B01J 20/32*** | (2006.01) |
| ***B09C 1/08*** | (2006.01) |
| ***C02F 1/28*** | (2023.01) |
| ***C10B 53/02*** | (2006.01) |
| ***C10B 57/08*** | (2006.01) |
| *C02F 101/10* | (2006.01) |
| *C02F 101/20* | (2006.01) |

(52) U.S. Cl.

CPC ............... *B01J 20/20* (2013.01); *B01J 20/08* (2013.01); *B01J 20/28009* (2013.01); *B01J 20/28059* (2013.01); *B01J 20/28061* (2013.01); *B01J 20/3078* (2013.01); *B01J 20/3208* (2013.01); *B01J 20/3225* (2013.01); *B01J 20/3287* (2013.01); *B01J 20/3293* (2013.01); *B09C 1/08* (2013.01); *C02F 1/288* (2013.01); *C10B 53/02* (2013.01); *C10B 57/08* (2013.01); *B09C 2101/00* (2013.01); *C02F 1/281* (2013.01); *C02F 1/283* (2013.01); *C02F 2101/103* (2013.01); *C02F 2101/20* (2013.01)

(58) Field of Classification Search

CPC ...... B01J 20/20; B01J 20/08; B01J 20/28009; B01J 20/28059; B01J 20/28061; B01J 20/3078; B01J 20/3208; B01J 20/3225; B01J 20/3287; B01J 20/3293; B09C 1/08; B09C 2101/00; C02F 1/288; C02F 1/281; C02F 1/283; C02F 2101/103; C02F 2101/20; C10B 53/02; C10B 57/08

See application file for complete search history.

(56) References Cited

U.S. PATENT DOCUMENTS

2018/0016162 A1* 1/2018 Wang ..................... C01G 49/08
2022/0126267 A1* 4/2022 Luo ......................... C02F 1/288

* cited by examiner

*Primary Examiner* — Stuart L Hendrickson
(74) *Attorney, Agent, or Firm* — Hawaii Patent Services; Nathaniel K. Fedde; Kenton N. Fedde

(57) ABSTRACT

The present invention relates to layered multi-metal-oxide-based magnetic biochar and a preparation method and use thereof. The preparation method includes: S1. mixing biomass and an iron salt solution for impregnation, and then adjusting a first pH value of a solid phase material after solid-liquid separation to obtain pretreated biomass; and S2. pyrolyzing the pretreated biomass to obtain magnetic biochar, then mixing the magnetic biochar with a solution containing at least two metal salts and adjusting a second pH value, and then performing hydrothermal treatment to obtain the layered multi-metal-oxide-based magnetic biochar. The obtained layered multi-metal-oxide-based magnetic biochar has a large specific surface area, magnetic properties, a layered morphology, and strong adsorption capacity, and can be applied to the treatment of arsenic- and cadmium-containing composite contaminated water bodies, and also to arsenic and cadmium passivation in farmland soil, thereby reducing health risks of crops in the food chains, and ensuring food safety.

8 Claims, 2 Drawing Sheets

LAYERED MULTI-METAL-OXIDE-BASED MAGNETIC BIOCHAR AND PREPARATION METHOD AND USE THEREOF

TECHNICAL FIELD

The present invention relates to the technical field of environmental protection, in particular to a layered multi-metal-oxide-based magnetic biochar and a preparation method and use thereof, and more particularly to a layered multi-metal-oxide-based magnetic biochar and a preparation method thereof, and a method for controlling arsenic and/or cadmium contamination.

BACKGROUND

At present, arsenic and cadmium are (quasi) heavy metal elements widely found in soil, which have serious impacts on the ecological environment and human health.

Waste biomass is an important agricultural waste and comes from a wide range of sources, especially major crop straws (including wheat straw, rice husk, corn straw, bamboo chips, etc.), wherein the waste biomass is converted into biochar and used in agricultural production. For example, the application of the biochar can show favorable effects in fixing soil carbon, enhancing soil fertility and reducing greenhouse effects.

In recent years, many studies have shown that biochar has a good effect on cadmium-contaminated water and soil environments. For example, CN114471463A discloses biochar that absorbs heavy metal cadmium and a preparation method and application thereof, wherein the biochar is prepared by taking fast-growing grass biomass as a raw material, followed by bacterial decaying modification, fungal decomposition modification and oxygen barrier carbonization. The bacterial decaying modification includes: mixing the fast-growing grass biomass with a bacterial nitrogen source and a bacterial agent with a cellulose-degrading ability well, and then fermenting and decaying the mixed solution to obtain bacterially decayed biomass. The fungal decomposition modification includes: mixing the bacterially decayed biomass with a fungal nitrogen source and lime water well and sterilizing the mixture, then cooling the mixture to room temperature and inoculating the mixture with a fungal strain, and culturing and then harvesting residues after fungal fruiting bodies. However, the modified biochar is designed to verify an adsorption effect on arsenic.

CN107413296A discloses a biochar iron-manganese spinel composite material that adsorbs heavy metal antimony and cadmium. A preparation method of the biochar iron-manganese spinel composite material includes: adding a solution B dropwise into a suspension A at a constant speed, stirring for 2.5-3.5 h, and then centrifuging, washing and drying to prepare the biochar iron-manganese spinel composite material, wherein the solution B is a 0.1 mol/L potassium permanganate solution, and the suspension A is composed of water, ferrous sulfate heptahydrate and tea branch biochar in a weight ratio of 100:(8.0-8.5):(0.8-1.2). The biochar composite material has a larger specific surface area and porosity, which is thus more conducive to the adsorption of heavy metals and has a certain adsorption effect on arsenic- and antimony-contaminated water bodies, however, adsorption effects on arsenic and cadmium composite contaminated water bodies are unknown.

However, the alkaline nature of biochar can cause cadmium precipitation. Due to an electrostatic repulsion, original biochar has a limited remediation effect on anionic arsenic contamination, thus restricting its application in an arsenic- and cadmium-containing composite contamination environment. It can be seen that in the prior art, the use of the biochar still has poor adsorption and removal effects in controlling heavy metal contaminating elements such as arsenic and/or cadmium.

SUMMARY

In view of the problems existing in the prior art, an object of the present invention is to provide a layered multi-metal-oxide-based magnetic biochar and a preparation method and use thereof. The obtained layered multi-metal-oxide-based magnetic biochar has a large specific surface area, magnetic properties, a layered morphology, and strong adsorption capacity, and can be applied to the treatment of arsenic- and cadmium-containing composite contaminated water bodies, and also to arsenic and cadmium passivation in farmland soil, thereby reducing health risks of crops in the food chains, and ensuring food safety.

To achieve this object, the present invention adopts the following technical solutions.

In a first aspect, the present invention provides a preparation method for the layered multi-metal-oxide-based magnetic biochar. The preparation method includes:

S1. mixing biomass and an iron salt solution for impregnation, and then adjusting a first pH value of a solid phase material after solid-liquid separation to obtain a pretreated biomass; and S2. pyrolyzing the pretreated biomass to obtain magnetic biochar, then mixing the magnetic biochar with a solution containing at least two metal salts and adjusting a second pH value, and then performing hydrothermal treatment to obtain the layered multi-metal-oxide-based magnetic biochar.

The preparation method for the layered multi-metal-oxide-based magnetic biochar provided by the present invention is to use an iron salt pre-impregnation technology to pre-magnetize the biomass and then perform a pyrolysis treatment to enhance the activity of iron oxides, and then perform a cross-linking reaction on a bimetal oxide solution and the magnetic biochar using a hydrothermal method to prepare a modified biochar for controlling arsenic and cadmium contamination.

As a preferred technical solution of the present invention, the biomass includes any one or a combination of at least three of wheat straw, rice husk, bamboo chips, sludge or garlic, preferably garlic, bamboo chips and garlic.

Preferably, the biomass has a particle size of 60-100 meshes.

As a preferred technical solution of the present invention, the iron salt solution includes a mixed solution of ferrous iron and ferric iron.

Preferably, a molar ratio of the ferric iron to the ferrous iron in the iron salt solution is (1-4):1.

Preferably, a mass ratio of the biomass to an iron salt used in preparing the iron salt solution is (0.5-3):1.

As a preferred technical solution of the present invention, a stirring speed during the impregnation is 300-1000 r/min.

Preferably, the stirring time during the impregnation is 4-48 h.

As a preferred technical solution of the present invention, an end point of the first pH value adjustment is that a pH value of a solid phase material is 6.5-7.5.

As a preferred technical solution of the present invention, the pyrolysis temperature is 400-800° C.

Preferably, the pyrolysis time is 1-6 h.

As a preferred technical solution of the present invention, metal ions in the solution containing at least two metal salts include a combination of at least two of magnesium ions, aluminum ions, iron ions or calcium ions.

Preferably, a molar ratio of trivalent metal ions to divalent metal ions in the solution containing at least two metal salts is (1-4):1.

Preferably, a solid-liquid ratio g/mL of the magnetic biochar to the solution containing at least two metal salts is 1:(1-20).

As a preferred technical solution of the present invention, the second pH value is adjusted to adjust the pH value of the solution to 8-10.

Preferably, the hydrothermal treatment is to evaporate the materials to dryness using a hydrothermal method.

Preferably, an evaporation to dryness temperature is 80-110° C.

In a second aspect, the present invention provides layered multi-metal-oxide-based magnetic biochar prepared by the preparation method according to the first aspect; and a specific surface area BET of the layered multi-metal-oxide-based magnetic biochar is 11.8-310.5 $m^2 \cdot g^{-1}$.

In a third aspect, the present invention provides use of the layered multi-metal-oxide-based magnetic biochar obtained by the preparation method according to the first aspect, in particular to a method for controlling arsenic and/or cadmium contamination, the method including controlling arsenic and/or cadmium contamination using the layered multi-metal-oxide-based magnetic biochar according to the first aspect, wherein in response to controlling an arsenic- and/or cadmium-containing solution, a solid-liquid ratio mg/L of the layered multi-metal-oxide-based magnetic biochar to an arsenic- and/or cadmium-containing waste liquid is (0.5-5) g/L; and in response to controlling arsenic- and/or cadmium-containing contaminated soil, a dosage of the layered multi-metal-oxide-based magnetic biochar is 500-2000 kg/mu.

Compared with existing technical solutions, the present invention has the following beneficial effects.

(1) The bimetal oxide-based magnetic biochar provided by the present invention has a large specific surface area, which can reach 310.55 $m^2 \cdot g^{-1}$, and is easy to recycle. A mass percentage of iron can be increased to 29.95%, a mass percentage of calcium can be increased to 20.55%, a mass percentage of magnesium can be increased to 21.52%, and a mass percentage of aluminum can be increased to 10.11%. The bimetal oxide-based magnetic biochar has a good adsorption effect on arsenic (its adsorption capacity for arsenic can reach 85.77-206.58 $mg \cdot g^{-1}$, and its adsorption capacity for cadmium can reach 107.86-216.17 $mg \cdot g^{-1}$), has high treatment efficiency for arsenic- and cadmium-containing wastewater, and can effectively adsorb arsenic and cadmium in water (a removal rate of arsenic and cadmium in the wastewater can reach more than 85%). The modified biochar bimetal oxide-based magnetic biochar can treat and make safe use of arsenic and cadmium contaminated wastewater to reduce contamination and improve quality, which not only reduces the harms of contaminated wastewater to an aquatic environment, but also provides new ideas for the safe and efficient utilization of waste biomass. Meanwhile, the modified biomass charcoal bimetal oxide-based magnetic biochar can be applied to the remediation of arsenic and cadmium contaminated sites or the safe utilization of arsenic and cadmium contaminated farmland, which not only enhances the farmland productivity and soil fertility, but also enhances the stamina of agricultural production, and also has obvious significance in ensuring the sustainable use of land resources.

(2) The preparation method of the bimetal oxide-based magnetic biochar provided by the present invention is simple, easy to implement and has strong application adaptability. The modified biomass charcoal is treated at a temperature of 80-100° C. and consumes little energy. Other treatments are performed under conventional conditions. The preparation method has wide adaptability due to stable raw materials.

(3) The bimetal oxide-based magnetic biochar provided by the present invention is prepared from biomass raw materials such as municipal sludge, bamboo powder and garlic. The biomass raw materials are widely sourced from bulky and difficult-to-process biomass, convenient to take and highly achievable, realize the resource utilization of biomass wastes, are of a new agricultural production method for the rural economy and can produce huge economic benefits.

The present invention is described in further detail below. However, the following examples are only simple examples of the present invention and do not represent or limit the protection scope of the present invention. The protection scope of the present invention shall be subjected to the claims.

DETAILED DESCRIPTION OF EMBODIMENTS

In order to better illustrate the present invention and facilitate understanding of the technical solutions of the present invention, typical but non-limiting examples of the present invention are as follows.

Figure 1:
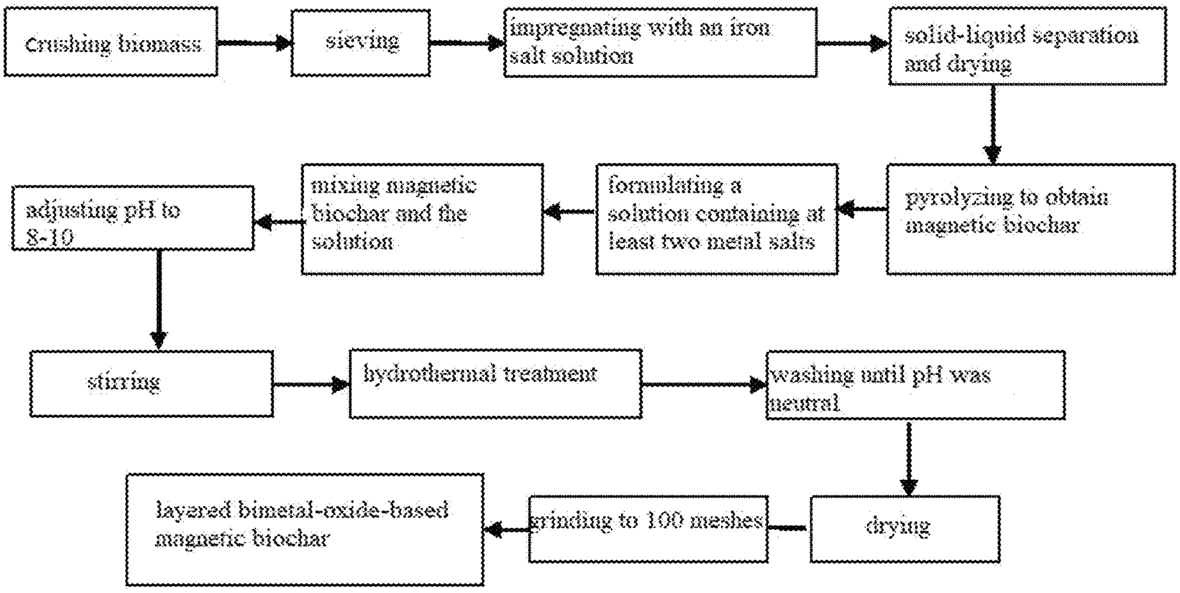
FIG. 1 is a flowchart of a preparation method of a layered multi-metal-oxide-based magnetic biochar provided by an embodiment of the present invention.

This example provides a preparation method of a layered multi-metal-oxide-based magnetic biochar. As shown in FIG. 1, the preparation method includes:

S1. mixing biomass and an iron salt solution for impregnation, and then adjusting a first pH value of a solid phase material after solid-liquid separation to obtain a pretreated biomass; and S2. pyrolyzing the pretreated biomass to obtain magnetic biochar, then mixing the magnetic biochar with a solution containing at least two metal salts and adjusting a second pH value, and then performing hydrothermal treatment to obtain the layered multi-metal-oxide-based magnetic biochar.

In the present invention, the product prepared from multi-metal oxides contains at least two metal oxides.

Specifically, the biomass is any one or a combination of at least three of wheat straw, rice husk, bamboo chips, sludge or garlic, preferably garlic, bamboo chips and garlic. Typical but non-limiting combinations include wheat straw, rice husk and garlic, sludge, rice husk and bamboo chips, wheat straw, garlic and sludge. The biomass, which is used as a raw material, has the advantages of stable output, wide sources, and low application cost.

The sludge, bamboo chips and garlic are preferred because sludge charcoal has a wide range of sources and rich ash content that helps to bind with anions, bamboo chips charcoal has a large specific surface area and serves as a good modification carrier; and garlic charcoal is rich in sulfhydryl groups, which are conducive to binding with cadmium.

The biomass may be cleaned and dried before use to avoid the influences of other factors on the obtained product. A lotion used in cleaning may be water, alcohol or other commonly used lotions in the art. Deionized water, tap water, industrial return water and other water that meets the requirements are used for cleaning; and drying can be done by conventional drying methods in the art, such as oven drying, or air drying. When drying is used, a drying temperature may be selected to be 60-80° C.

Specifically, the biomass has a particle size of 60-100 meshes.

In the present invention, the biomass particles may be aggregates of any particles that meet the requirements within this range. For example, particle aggregates of uniform particle size are selected, such as particle aggregates of 60 meshes, particle aggregates of 70 meshes, particle aggregates of 80 meshes, or particle aggregates within a certain particle size range, e.g., aggregates of all particles within a particle size range of 60-80 meshes, aggregates of all particles within a particle size range of 70-90 meshes, and aggregates of all particles within a particle size range of 80-1000 meshes.

Specifically, the iron salt solution includes a mixed solution of ferrous iron and ferric iron.

Specifically, a molar ratio of the ferric iron to the ferrous iron in the iron salt solution is (1-4):1, for example, may be 1:1, 1.5:1, 2:1, 2.5:1, 3:1, 3.5:1 or 4:1, etc., but is not limited to the listed values. Other unlisted values within this range are also applicable.

Specifically, a mass ratio of the biomass to the iron salt used in preparing the iron salt solution is (0.5-3):1, for example, may be 0.5:1, 1:1, 1.5:1, 2:1, 2.5:1 or 3:1, etc., but not limited to the listed values. Other unlisted values within this range are also applicable.

The ferric iron in the iron salt solution may be formulated with soluble ferric iron salts commonly used in the art such as ferric nitrate heptahydrate. For example, ferric chloride, ferric sulfate, etc. can also be selected. A molar concentration of the ferric iron in the solution is 0.2-0.4 mol/L, for example, may be 0.2 mol/L, 0.21 mol/L, 0.23 mol/L, 0.25 mol/L, 0.27 mol/L, 0.31 mol/L, 0.33 mol/L, 0.35 mol/L, 0.37 mol/L, 0.39 mol/L or 0.40 mol/L, etc., but is not limited to the listed values. Other unlisted values within this range are also applicable.

The ferrous iron in the iron salt solution may be formulated with soluble ferrous iron salts commonly used in the art such as ferrous sulfate nonahydrate. For example, ferrous chloride, ferrous nitrate, etc. can be selected. A molar concentration of the ferrous iron in the solution is 0.1-0.3 mol/L, for example, may be 0.1 mol/L, 0.12 mol/L, 0.14 mol/L, 0.16 mol/L, 0.18 mol/L, 0.2 mol/L, 0.22 mol/L, 0.24 mol/L, 0.26 mol/L, 0.28 mol/L or 0.3 mol/L, etc., but is not limited to the listed values. Other unlisted values within this range are also applicable.

Specifically, a stirring speed during the impregnation is 300-1000 r/min. The stirring method may be selected for magnetic stirring or propeller stirring or other common stirring methods in the art. For example, the stirring speed may be 300 r/min, 400 r/min, 500 r/min, 600 r/min, 700 r/min, 800 r/min, 900 r/min or 1000 r/min, etc., but is not limited to the listed values. Other unlisted values within this range are also applicable.

Preferably, the stirring time during the impregnation is 4-48 h, for example, may be 4 h, 8 h, 10 h, 15 h, 20 h, 24 h, 30 h, 40 h or 48 h, etc., but is not limited to the listed values. Other unlisted values within this range are also applicable.

The solid-liquid separation after impregnation may be carried out by suction filtration, or by filtration, pressure filtration and other solid-liquid separation methods commonly used in the art, with the purpose of separating a liquid phase from the materials.

Specifically, an end point of the first pH value adjustment is that a pH value of a solid phase material is 6.5-7.5, for example, may be 6.5, 6.6, 6.8, 7, 7.2, 7.4 or 7.5, etc., but is not limited to the listed values. Other unlisted values within this range are also applicable. To control a specific pH value range is beneficial to promote the precipitation of iron ions on the surface of the biomass to form ferrihydrite, which is conducive to the generation of goethite and magnetite during the pyrolysis process, thereby improving the adsorption performance of the layered multi-metal-oxide-based magnetic biochar. The detection of the pH value in this process refers to pH value measurement for a residual liquid phase after pH adjustment. When the pH value of the residual liquid phase is 6.5-7.5, which meets the requirements.

Furthermore, the pretreated biomass obtained in S1 may be dried for better subsequent operations.

Specifically, the pyrolysis temperature is 400-800° C., for example, may be 400° C., 450° C., 500° C., 550° C., 600° C., 650° C., 700° C., 750° C. or 800° C., but is not limited to the listed values. Other unlisted values within this range are also applicable.

Specifically, the pyrolysis time is 1-6 h, for example, may be 1 h, 2 h, 3 h, 4 h, 5 h or 6 h, etc., but is not limited to the listed values. Other unlisted values within this range are also applicable.

Specifically, the metal ions in the solution containing at least two metal salts include a combination of at least two of magnesium ions, aluminum ions, iron ions or calcium ions, examples of which are but not limited to magnesium ions and aluminum ions, calcium ions and aluminum ions, magnesium ions and iron ions, calcium ions, magnesium ions and aluminum ions, calcium ions, iron ions and aluminum ions, etc., preferably a combination of calcium ions, magnesium ions and aluminum ions.

In the present invention, the metal ions in the solution containing at least two metal salts should preferably include both trivalent metal ions and divalent metal ions.

Specifically, a molar ratio of the trivalent metal ions to the divalent metal ions in the solution containing at least two metal salts is (1-4):1, for example, may be 1:1, 1.5:1, 2:1, 2.5:1, 3:1, 3.5:1 or 4, etc., but are not limited to the listed values. Other unlisted values within this range are also applicable.

In the present invention, the molar ratio of the trivalent metal ions to the divalent metal ions in the solution containing at least two metal salts is a molar ratio of all trivalent metal ions to all divalent metal ions.

Further, during the mixing process of the magnetic biochar and the solution containing at least two metal salts in S2, a mass ratio of the magnetic biochar to all the metal salts used in the solution containing at least two metal salts is controlled to be 1:(0.5-3), for example, may be 1:0.5, 1:1, 1:1.5, 1:2, 1:2.5 or 1:3, etc., but is not limited to the listed values. Other unlisted values within this range are also applicable.

Preferably, a solid-liquid ratio g/mL of the magnetic biochar to the solution containing at least two metal salts is 1:(1-20), for example, may be 1:1, 1:2, 1:4, 1:6, 1:8, 1:10, 1:12, 1:14, 1:16, 1:18 or 1:20, etc., but is not limited to the listed values. Other unlisted values within this range are also applicable.

Specifically, the second pH value is adjusted to adjust the pH value of the solution to 8-10, for example, may be 8, 8.5, 9, 9.5 or 10, etc., but is not limited to the listed values. Other unlisted values within this range are also applicable.

Preferably, the hydrothermal treatment is to evaporate the materials to dryness using a hydrothermal method.

Preferably, an evaporation to dryness temperature is 80-110° C., for example, may be 80° C., 85° C., 90° C., 95° C., 100° C., 105° C. or 110° C., etc., but is not limited to the listed values. Other unlisted values in this range are also applicable.

In the present invention, in order to make the layered multi-metal-oxide-based magnetic biochar obtained by hydrothermal treatment efficient and practical, the product obtained after hydrothermal treatment may also be ground and sieved to obtain a powdery product that meets usage requirements.

Further, the present invention provides a layered multi-metal-oxide-based magnetic biochar, which is prepared by the preparation method as described above.

A specific surface area BET of the layered multi-metal-oxide-based magnetic biochar is 11.8-310.5 $m^2 \cdot g^{-1}$.

In the present invention, the obtained layered multi-metal-oxide-based magnetic biochar includes the following components in percentage by mass: 10.00-83.75% of C, 7.12-44.1% of O, 6.15-29.52% of Fe and 1.28-52.18% of M, in a total of 100%; and M includes one or a combination of at least two of Ca, Mg or Al.

When the obtained layered multi-metal-oxide-based magnetic biochar contains Ca, Ca is 3.33-20.55%; when the obtained layered multi-metal-oxide-based magnetic biochar contains Mg, Mg is 2.66-21.52%; and when the obtained layered multi-metal-oxide-based magnetic biochar contains Al, Al is 1.28-10.11%.

Further, the present invention provides a method for treating arsenic and/or cadmium contamination. The method includes controlling arsenic and/or cadmium contamination using the layered multi-metal-oxide-based magnetic biochar as previously described;

in response to controlling an arsenic- and/or cadmium-containing solution, a solid-liquid ratio mg/L of the layered multi-metal-oxide-based magnetic biochar to an arsenic- and/or cadmium-containing waste liquid is (0.5-5) g/L; and in response to controlling arsenic and/or cadmium-containing contaminated soil, a dosage of the layered multi-metal-oxide-based magnetic biochar is 500-2000 kg/mu.

In order to further illustrate excellent properties of the layered multi-metal-oxide-based magnetic biochar prepared in the present invention, the following practical examples are specifically provided for illustration as follows.

Example 1

This example provides a preparation method of the layered multi-metal-oxide-based magnetic biochar. The preparation method includes the following steps:

(1) crushing bamboo and sieving the crushed bamboo through an 80-mesh sieve to obtain an undersized biomass raw material;

(2) magnetically stirring the crushed biomass raw material and an iron salt mixed solution with a molar ratio of ferric iron to ferrous iron of 3:1 at a mass ratio (biomass solid:iron salt) of 1:1 for 24 h at 500 r/min, followed by performing suction filtration, adjusting a pH value of a solid phase to 7, then drying at 60° C., finally pyrolyzing at 400° C., 600° C. and 800° C. for 2 h respectively, and crushing to 100 meshes to obtain a magnetic biochar at corresponding temperatures;

(3) mixing a calcium magnesium aluminum salt solution with a molar ratio of trivalent metal to divalent metal of 3:1 and magnetic biochar obtained at different pyrolysis temperatures at respective loading ratios of 0.5:1, 1:1 or 2:1 and a solid-liquid ratio of 1 g:20 mL; adjusting the pH of the mixed solution to 8 with 1 mol/L sodium hydroxide; then cross-linking the mixed solution by a hydrothermal method at an evaporation temperature of 90° C. until the water is evaporated to dryness, then washing with ionized water until a pH value of the washing liquid is 7, freeze-drying, grinding for 30 min, and crushing to a particle size of 100 meshes to obtain the layered multi-metal-oxide-based magnetic biochar.

Example 2

The only difference from Example 1 is that the biomass is replaced with sludge and garlic respectively to obtain multi-metal-oxide-based magnetic sludge charcoal, multi-metal-oxide-based magnetic garlic charcoal and multi-metal-oxide-based magnetic bamboo charcoal respectively.

Example 3

This example provides a preparation process of biochar. Specifically, bamboo, sludge and garlic are used as biomass raw materials respectively. After being crushed and sieved with an 80-mesh sieve, the sieved products are pyrolyzed at 400° C., 600° C. and 800° C. for 2 h to obtain a pyrolyzed biochar.

The main physical and chemical properties of the biochar before and after modification in Examples 1-3 are analyzed. The testing process of specific surface area, pore volume and pore diameter is to use a standard degassing station of Micromeritics Instruments to pretreat a sample for 8 h under a vacuum condition of 200° C., and then use a 4-station fully automatic specific surface area analyzer of USA Micromeritics APSP2460 model to perform a nitrogen adsorption and desorption test on the sample under a 77 k liquid nitrogen condition. After the instrument analysis is completed, an isothermal adsorption and desorption curve is obtained. The total specific surface area, pore volume and pore diameter of the material are obtained through a BET method. The analysis results are detailed in Table 1.

TABLE 1

| Biochar type | Mass percentage of main elements (%) C | O | Fe | Ca | Mg | Al | Specific surface area BET ($m^2/g$) | Pore volume ($cm^3/g$) | Pore diameter (nm) |
|---|---|---|---|---|---|---|---|---|---|
| B-BC | 95.22 | 1.22 | 0.21 | 0.33 | 0.52 | 0.54 | 366.32 | 0.1841 | 1.677 |
| B-MBC | 75.22 | 12.12 | 16.22 | 0.23 | 0.33 | 0.14 | 212.12 | 127.11 | 2.311 |
| G-BC | 96.21 | 0.52 | 0.63 | 0.14 | 0.18 | 0.32 | 10.32 | 0.0003 | 2.1114 |
| G-MBC | 76.63 | 10.15 | 15.32 | 0.11 | 0.42 | 0.22 | 5.32 | 0.0004 | 2.3352 |
| S-BC | 95.66 | 2.21 | 0.01 | 0.21 | 0.11 | 0.06 | 52.32 | 0.0614 | 8.9965 |
| S-MBC | 70.32 | 13.32 | 15.63 | 0.63 | 0.11 | 0.20 | 32.12 | 0.0333 | 10.0014 |
| L0.5MBC400 | 72.44 | 19.71 | 5.00 | 1.12 | 1.00 | 0.96 | 11.841 | 0.0079 | 1.4830 |
| L1MBC400 | 53.18 | 16.85 | 5.96 | 10.23 | 8.95 | 6.52 | 5.535 | 0.0058 | 2.6543 |
| L2MBC400 | 25.32 | 34.56 | 2.99 | 17.14 | 10.22 | 9.69 | 1.613 | 0.0001 | 2.9060 |
| L0.5MBC600 | 68.03 | 7.85 | 11.32 | 6.65 | 3.2 | 3.25 | 276.438 | 0.1159 | 1.6284 |
| L1MBC600 | 45.96 | 16.33 | 6.99 | 17.06 | 7.29 | 8.12 | 220.112 | 0.0747 | 1.7032 |
| L2MBC600 | 10.77 | 35.12 | 3.55 | 18.65 | 19.12 | 12.41 | 132.626 | 0.0582 | 1.7560 |
| L0.5MBC800 | 57.86 | 20.12 | 4.66 | 8.69 | 6.52 | 4.84 | 309.487 | 0.1260 | 1.6783 |
| L1MBC800 (B-LMBC) | 14.86 | 35.66 | 3.55 | 21.35 | 12.77 | 11.36 | 229.283 | 0.0965 | 1.6835 |
| L2MBC800 | 3.73 | 32.21 | 2.88 | 25.14 | 20.36 | 15.66 | 153.653 | 0.0658 | 1.7545 |
| S-LMBC | 16.5 | 30.22 | 4.52 | 20.36 | 14.52 | 10.24 | 9.7697 | 0.0168 | 6.8856 |
| G-LMBC | 19.66 | 30.21 | 4.01 | 18.96 | 11.24 | 10.88 | 14.534 | 0.0561 | 15.4165 |

Note: B-BC is bamboo-sourced 800° C. pyrolyzed biochar, and B-MBC is bamboo-sourced 800° C. pyrolyzed magnetic biochar; G-BC is garlic-sourced 800° C. pyrolyzed biochar, and G-MBC is garlic-sourced 800° C. pyrolyzed magnetic biochar; S-BC is sludge-sourced 800° C. pyrolyzed biochar, and S-MBC is sludge-sourced 800° C. pyrolyzed magnetic biochar; LMBC is layered multi-metal-oxide-based magnetic biochar from bamboo biomass, in $L_xMBC_y$, x represents a loading ratio (multi-metal oxide: magnetic biochar), for example, x=0.5 means 0.5:1, x=1 means 1:1, x=2 represents 2:1, y represents a pyrolysis temperature, which is 400° C., 600° C. and 800° C.; S-LMBC and G-LMBC represent layered multi-metal-oxide-based magnetic biochar from sludge biomass and layered multi-metal-oxide-based magnetic biochar from garlic biomass, respectively, and their preparation conditions are a multi-metal oxide loading ratio of 1:1 and pyrolysis at 800° C.

Figure 2:
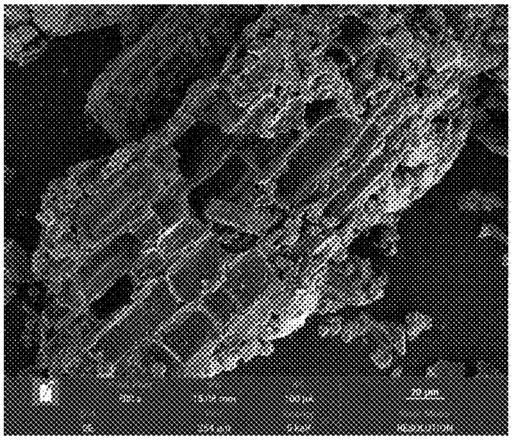
FIG. 2 is a scanning electron microscope image of original biochar obtained from a biomass raw material bamboo in Example 3 of the present invention.
Figure 3:
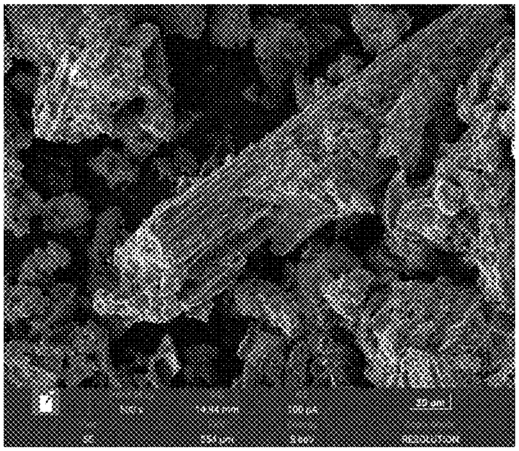
FIG. 3 is a scanning electron microscope image of a magnetic biochar obtained in Example 1 of the present invention.
Figure 4:
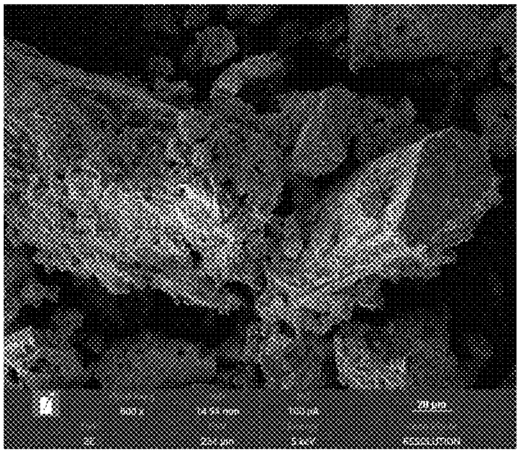
FIG. 4 is a scanning electron microscope image of the layered multi-metal-oxide-based magnetic biochar obtained in Example 1 of the present invention.

As can be seen from Table 1, the bamboo biomass has the highest specific surface area when pyrolyzed at 800° C., so it is a good modified cross-linking carrier. Compared with unmodified biochar from various biomass sources, the modified biochar has a slightly reduced specific surface area, but greatly increased content of iron, calcium, magnesium and aluminum, and has a mass percentage up to 10-30%. The introduction of metal elements means the increase of effective active adsorption sites, which can effectively bind arsenic and cadmium. As can be seen more clearly from FIGS. 2-4, the surface of the multi-metal-oxide-based magnetic sludge charcoal has a layered wrinkle morphology, which is due to the precipitation and loading of a nano-layered multi-metal oxide on the surface of a biochar matrix.

Example 4

This example provides a preparation method of the layered multi-metal-oxide-based magnetic biochar. The method includes the following steps:

(1) crushing bamboo and sieving the crushed bamboo through an 80-mesh sieve to obtain an undersized biomass raw material;

(2) magnetically stirring the crushed biomass raw material with a mixed iron salt solution with a molar ratio of ferric iron to ferrous iron of 3:1 at a mass ratio (biomass solid:iron salt) of 1:1 for 24 h at 500 r/min, followed by performing suction filtration, controlling a pH value of a solid phase to 7, then drying the solid phase at 60° C., finally pyrolyzing at 400° C. for 2 h, and crushing to 100 meshes to obtain magnetic biochar;

(3) mixing a calcium magnesium aluminum salt solution with a molar ratio of trivalent metal to divalent metal of 3:1 and magnetic biochar at a loading ratio of 1:1 and a solid-liquid ratio of 1 g:20 mL; adjusting the pH of the mixed solution to 8 with 1 mol/L sodium hydroxide; then cross-linking the mixed solution by a hydrothermal method at an evaporation temperature of 90° C. until the water is evaporated to dryness, then washing with ionized water until a pH value of the washing liquid is 7, freeze-drying, grinding for 30 min, and crushing to a particle size of 100 meshes to obtain the layered multi-metal-oxide-based magnetic biochar.

Furthermore, this example also provides original biochar corresponding to biomass raw materials, and a preparation process is as follows:

the bamboo is crushed and sieved with an 80-mesh sieve; and then, the undersized product is pyrolyzed in a muffle furnace for 2 h at a pyrolysis temperature of 400° C., and cooled to 30° C. to obtain the original biochar.

Example 5

The only difference from Example 4 is that the pyrolysis temperature is changed to 600° C. in step (2) of preparing the layered multi-metal-oxide-based magnetic biochar.

Furthermore, this example also provides the original biochar corresponding to biomass raw materials, and a preparation process is as follows:

the bamboo is crushed and sieved with an 80-mesh sieve; and then, the undersized product is pyrolyzed in a muffle furnace for 2 h at a pyrolysis temperature of 600° C., and cooled to 30° C. to obtain original biochar.

Example 6

The only difference from Example 4 is that the pyrolysis temperature is changed to 800° C. in step (2) of preparing the layered multi-metal-oxide-based magnetic biochar.

Furthermore, this example also provides the original biochar corresponding to biomass raw materials, and a preparation process is as follows:

the bamboo is crushed and sieved with an 80-mesh sieve; and then, the undersized product is pyrolyzed in a muffle furnace for 2 h at a pyrolysis temperature of 800° C., and cooled to 30° C. to obtain original biochar.

Example 7

This example provides a preparation method of the layered multi-metal-oxide-based magnetic biochar. This method includes the following steps:

(1) crushing bamboo and sieving the crushed bamboo through an 80-mesh sieve to obtain an undersized biomass raw material;

(2) magnetically stirring the crushed biomass raw material with mixed iron salt solutions with molar ratios of ferric iron to ferrous iron of 0.5:1, 1:1 and 2:1 at a mass ratio (biomass solid:iron salt) of 0.5:1 for 24 h at 500 r/min, followed by performing suction filtration, controlling a pH value of a solid phase to 7, then drying the solid phase at 60° C., finally pyrolyzing at 800° C. for 2 h, and crushing to 100 meshes to obtain magnetic biochar; and (3) mixing a calcium magnesium aluminum salt solution with a molar ratio of trivalent metal to divalent metal of 3:1 and magnetic biochar at a loading ratio of 0.5:1 and a solid-liquid ratio of 1 g:10 mL; adjusting the pH of the mixed solution to 9 with 1 mol/L sodium hydroxide; then cross-linking the mixed solution by a hydrothermal method at an evaporation temperature of 90° C. until the water is evaporated to dryness, then washing with ionized water until a pH value of the washing liquid is 7, freeze-drying, grinding for 30 min, and crushing to a particle size of 100 meshes to obtain the layered multi-metal-oxide-based magnetic biochar.

Example 8

The only difference from Example 7 is that a loading ratio of the calcium magnesium aluminum salt solution is adjusted to 1:1 in step (3) of preparing the layered multi-metal-oxide-based magnetic biochar.

Example 9

The only difference from Example 7 is that a loading ratio of the calcium magnesium aluminum salt solution is adjusted to 2:1 in step (3) of preparing the layered multi-metal-oxide-based magnetic biochar.

Example 10

The only difference from Example 7 is that in step (3) of preparing the layered multi-metal-oxide-based magnetic biochar, the calcium magnesium aluminum salt solution is replaced by a calcium aluminum salt solution, and the loading ratio is adjusted to 2:1.

Example 11

The only difference from Example 7 is that in step (3) of preparing the layered multi-metal-oxide-based magnetic biochar, the calcium magnesium aluminum salt solution is replaced by a magnesium aluminum salt solution, and a loading ratio is adjusted to 2:1.

Example 12

The only difference from Example 7 is that in step (3) of preparing the layered multi-metal-oxide-based magnetic biochar, the calcium magnesium aluminum salt solution is replaced by the magnesium aluminum salt solution, and the loading ratio is adjusted to 2:1.

Example 13

The only difference from Example 6 is that during the preparation process, the biomass is first pyrolyzed to obtain biochar, which is then mixed and impregnated with an iron salt solution, and then dried and crushed. Step (3) remains unchanged.

Example 14

The only difference from Example 6 is that a molar ratio of trivalent metals to divalent metals in step (3) of preparing the multi-metal-oxide-based magnetic biochar (3) is adjusted to 1:3.

Application Example

This application example specifically illustrates a treatment effect of each layered multi-metal-oxide-based magnetic biochar obtained in Examples 4-14 on heavy metal elements arsenic and cadmium. To be specific:

1. Adsorption Performances of the Layered Multi-Metal-Oxide-Based Magnetic Biochar for Arsenic and Cadmium Under Preparation Conditions of Different Pyrolysis Temperatures The original biochar, magnetic biochar and layered multi-metal-oxide-based magnetic biochar in Examples 4-6 were weighed for 0.2500 g each, placed in a 50 mL conical flask, and added with 25 mL of As(III)/Cd(II) mixed solution with a concentration gradient of 10-250 $mg \cdot L^{-1}$; the pH of the solution was adjusted to 4.5; the solution was oscillated at a constant speed of 150 $r \cdot min^{-1}$ at room temperature for 8 h, and then centrifuged and separated; the supernatant was filtered; the arsenic content was measured with an atomic fluorescence spectrometer; the cadmium content was measured by inductively coupled plasma emission spectrometry; and an adsorption capacity was calculated based on the difference from an initial concentration; and each treatment was repeated three times.

The layered multi-metal-oxide-based magnetic biochar in Examples 4-6 was weighed for 0.2500 g each, placed in a 50 mL conical flask, and added with 25 mL of As(III)/Cd(II) mixed solution with a concentration of 100 $mg \cdot L^{-1}$; the pH of the solution was adjusted to 4.5; the solution was oscillated at a constant speed of 150 r/min at room temperature for 8 h, and then centrifuged and separated; the supernatant was filtered; the arsenic content was measured with an atomic fluorescence spectrometer; the cadmium content was measured by inductively coupled plasma emission spectrometry; and an adsorption efficiency was calculated in combination with an initial concentration; and each treatment was repeated three times. The adsorption capacity results were shown in Table 2, and the adsorption efficiency was shown in Table 3.

The adsorption capacity results were shown in Table 2, and the adsorption efficiency results were shown in Table 3.

The results can be seen from Table 2: the adsorption capacity of original biochar for arsenic is 5.9-15.9 mg·g$^{-1}$, and the adsorption capacity for cadmium is 20.1-39.2 mg·g$^{-1}$; the adsorption capacity of magnetic biochar for arsenic is 78.1-91.6 mg·g$^{-1}$, and the adsorption capacity for cadmium is 76.0-108.1 mg·g$^{-1}$; the adsorption capacity of the layered multi-metal-oxide-based magnetic biochar for arsenic is 105.1-189.6 mg·g$^{-1}$, and the adsorption capacity for cadmium is 152.1-206.8 mg·g$^{-1}$. The adsorption capacity of the layered multi-metal-oxide-based magnetic biochar prepared by this method for arsenic is 10-12 times higher than that of the original biochar, and for cadmium is 4-7 times higher than that of the original biochar.

The results can be seen from Table 3: the original biochar has a removal rate of 6-17% for arsenic and 16-34% for cadmium; the magnetic biochar has a removal rate of 46-69% for arsenic, and 52-79% for cadmium; the layered multi-metal-oxide-based magnetic biochar has a removal rate of 73-90% for arsenic and 75-91% for cadmium. The layered multi-metal-oxide-based magnetic biochar pyrolyzed at 800° C. has the best removal effect on arsenic and cadmium, with removal rates for both above 90%. The layered multi-metal-oxide-based magnetic biochar pyrolyzed at 400° C. has low removal rates for arsenic and cadmium, which are still above 70%. It can be seen that by functionalized modification of biochar with multi-metal oxides, the removal rates for arsenic and cadmium are greatly increased, and the removal capacities for arsenic and cadmium in water are greatly increased.

TABLE 2

| Biochar | Heavy metals | Arsenic and cadmium content in solutions with different concentrations/mg · L$^{-1}$: 10 | 20 | 30 | 50 | 70 | 100 | 150 | 200 | 250 | Adsorption capacity/ mg · g$^{-1}$ |
|---|---|---|---|---|---|---|---|---|---|---|---|
| Original charcoal pyrolyzed at 400° C. | As(III)<br>Cd(II) | 9.98<br>7.12 | 18.47<br>15.32 | 25.44<br>23.25 | 46.62<br>41.85 | 68.21<br>62.01 | 98.84<br>80.33 | 146.46<br>131.52 | 195.98<br>179.44 | 244.11<br>226.24 | 5.99<br>20.11 |
| Magnetic charcoal pyrolyzed at 400° C. | As(III)<br>Cd(II) | 3.99<br>5.33 | 9.48<br>11.21 | 15.44<br>15.45 | 26.63<br>23.89 | 38.22<br>35.76 | 64.84<br>57.02 | 116.47<br>100.83 | 161.91<br>144.43 | 197.40<br>192.56 | 78.01<br>76.04 |
| Multi-metal - oxide-based magnetic charcoal at 400° C. | As(III)<br>Cd(II) | 0.93<br>1.89 | 3.34<br>4.73 | 5.36<br>5.85 | 13.30<br>12.30 | 20.61<br>19.33 | 44.36<br>34.15 | 88.20<br>64.67 | 128.96<br>93.20 | 162.29<br>130.27 | 105.17<br>152.15 |
| Original charcoal pyrolyzed at 600° C. | As(III)<br>Cd(II) | 8.98<br>5.69 | 17.21<br>13.32 | 23.14<br>20.32 | 44.31<br>35.61 | 65.31<br>54.63 | 95.14<br>73.63 | 141.02<br>122.69 | 190.01<br>169.11 | 236.35<br>215.02 | 10.99<br>30.25 |
| Magnetic charcoal pyrolyzed at 600° C. | As(III)<br>Cd(II) | 2.91<br>0.88 | 6.29<br>3.12 | 12.45<br>3.70 | 22.17<br>6.17 | 35.30<br>10.09 | 58.48<br>20.76 | 107.68<br>41.45 | 153.00<br>70.96 | 185.22<br>103.83 | 88.16<br>84.13 |
| Multi-metal-oxide-based magnetic charcoal at 600° C. | As(III)<br>Cd(II) | 0.73<br>0.88 | 1.74<br>3.12 | 2.64<br>3.70 | 6.56<br>6.17 | 12.42<br>10.09 | 31.28<br>20.76 | 72.87<br>41.45 | 111.85<br>70.96 | 143.24<br>103.83 | 118.01<br>170.18 |
| Original charcoal pyrolyzed at 800° C. | As(III)<br>Cd(II) | 7.12<br>4.12 | 15.12<br>11.35 | 20.10<br>19.32 | 41.35<br>32.51 | 60.21<br>50.36 | 91.25<br>70.44 | 136.12<br>117.62 | 182.01<br>159.33 | 225.55<br>210.11 | 15.99<br>39.25 |
| Magnetic charcoal pyrolyzed at 800° C. | As(III)<br>Cd(II) | 1.89<br>2.45 | 4.39<br>4.41 | 8.42<br>5.72 | 15.44<br>10.10 | 25.38<br>16.05 | 53.23<br>33.12 | 198.25<br>71.44 | 142.23<br>110.22 | 176.30<br>149.86 | 91.63<br>108.56 |
| Multi-metal-oxide-based magnetic charcoal at 800° C. | As(III)<br>Cd(II) | 0.54<br>0.42 | 0.88<br>0.51 | 0.89<br>1.03 | 2.30<br>1.78 | 5.66<br>3.29 | 13.70<br>6.83 | 32.13<br>16.54 | 57.47<br>34.31 | 78.63<br>56.78 | 189.93<br>206.82 |

TABLE 3

| Biochar type | Original charcoal pyrolyzed at 400° C. | Magnetic charcoal pyrolyzed at 400° C. | Layered multi-metal-oxide-based magnetic charcoal at 400° C. | Original charcoal pyrolyzed at 600° C. | Magnetic charcoal pyrolyzed at 600° C. | Layered multi-metal-oxide-based magnetic charcoal at 600° C. | Original charcoal pyrolyzed at 800° C. | Magnetic charcoal pyrolyzed at 800° C. | Layered multi-metal-oxide-based magnetic charcoal at 800° C. |
|---|---|---|---|---|---|---|---|---|---|
| Arsenic removal rate/% | 6.76 | 46.74 | 73.4 | 11.38 | 55.66 | 86.88 | 17.3 | 69.12 | 90.4 |

TABLE 3-continued

| Biochar type | Original charcoal pyrolyzed at 400° C. | Magnetic charcoal pyrolyzed at 400° C. | Layered multi-metal-oxide-based magnetic charcoal at 400° C. | Original charcoal pyrolyzed at 600° C. | Magnetic charcoal pyrolyzed at 600° C. | Layered multi-metal-oxide-based magnetic charcoal at 600° C. | Original charcoal pyrolyzed at 800° C. | Magnetic charcoal pyrolyzed at 800° C. | Layered multi-metal-oxide-based magnetic charcoal at 800° C. |
|---|---|---|---|---|---|---|---|---|---|
| Cadmium removal rate/% | 16.3 | 52.22 | 75.4 | 28.78 | 87.66 | 87.66 | 34.98 | 79.8 | 91.44 |

When the layered multi-metal-oxide-based magnetic biochar obtained in Examples 4-6 adsorbs arsenic and cadmium waste liquids with different concentrations, such as 60 $mg \cdot L^{-1}$, 70 $mg \cdot L^{-1}$, 80 $mg \cdot L^{-1}$, 100 $mg \cdot L^{-1}$, 150 $mg \cdot L^{-1}$, etc., the removal efficiency of arsenic and cadmium in the solution is still above 80%.

3. Adsorption Performances of the Layered Multi-Metal-Oxide-Based Magnetic Biochar for Arsenic and Cadmium Under Preparation Conditions of Different Loading Ratios The layered multi-metal-oxide-based magnetic biochar under preparation conditions in Examples 7-9 was weighed for 0.2500 g each, placed in a 50 mL conical flask, and added with 25 mL of As(III)/Cd(II) mixed solution with a concentration gradient of 10-250 $mg \cdot L^{-1}$; the pH of the solution was adjusted to 4.5; the solution was oscillated at a constant speed of 150 $r \cdot min^{-1}$ at room temperature for 8 h, and then centrifuged and separated; the supernatant was filtered; the arsenic content was measured with an atomic fluorescence spectrometer; the cadmium content is measured by inductively coupled plasma emission spectrometry; and an adsorption capacity was calculated based on a difference from an initial concentration; and each treatment was repeated three times.

The layered multi-metal-oxide-based magnetic biochar in Examples 7-9 was weighed for 0.2500 g each, placed in a 50 mL conical flask, and added with 25 mL of As(III)/Cd(II) mixed solution with a concentration of 100 $mg \cdot L^{-1}$; the pH of the solution was adjusted to 4.5; the solution was oscillated at a constant speed of 150 r/min at room temperature for 8 h, and then centrifuged and separated; the supernatant was filtered; the arsenic content was measured with an atomic fluorescence spectrometer; the cadmium content was measured by inductively coupled plasma emission spectrometry; and the adsorption efficiency was calculated in combination with an initial concentration; and each treatment was repeated three times. The adsorption capacity results were shown in Table 4, and the adsorption efficiency was shown in Table 5.

As shown in Table 4 and Table 5, the higher layered multi-metal oxide loading ratio has higher adsorption capacity and removal rate; the adsorption capacity of the layered multi-metal-oxide-based magnetic biochar under the preparation condition of (2:1) loading ratio for arsenic and cadmium is about 1 times that under the preparation condition of (0.5:1) loading ratio, but the removal rate is increased by more than 30%, which shows that a high layered metal oxide loading ratio can increase the adsorption capacity of the modified biochar.

TABLE 4

| Biochar | Heavy metals | Arsenic and cadmium content in solutions with different concentrations/$mg \cdot L^{-1}$ | | | | | | | | | Adsorption capacity/ |
|---|---|---|---|---|---|---|---|---|---|---|---|
| | | 10 | 20 | 30 | 50 | 70 | 100 | 150 | 200 | 250 | $mg \cdot g^{-1}$ |
| Multi-metal (0.5:1) based magnetic charcoal | As(III) | 0.90 | 1.70 | 2.82 | 7.40 | 14.23 | 33.11 | 80.35 | 126.86 | 156.78 | 103.63 |
| | Cd(II) | 0.36 | 1.06 | 2.50 | 6.95 | 11.07 | 26.92 | 52.78 | 90.47 | 127.80 | 126.86 |
| Multi-metal (1:1) based magnetic charcoal | As(III) | 0.54 | 0.88 | 0.89 | 2.30 | 5.66 | 13.70 | 32.13 | 57.47 | 78.63 | 189.93 |
| | Cd(II) | 0.42 | 0.51 | 1.03 | 1.78 | 3.29 | 6.83 | 16.54 | 34.31 | 56.78 | 206.82 |
| Multi-metal (2:1)- based magnetic charcoal | As(III) | 0.03 | 0.59 | 1.07 | 1.62 | 3.82 | 8.60 | 23.33 | 43.97 | 63.00 | 206.58 |
| | Cd(II) | 0.12 | 0.32 | 0.64 | 1.33 | 2.74 | 5.17 | 14.86 | 26.61 | 46.10 | 236.17 |

TABLE 5

| Biochar type | Multi-metal (0.5:1) based magnetic charcoal | Multi-metal (1:1) based magnetic charcoal | Multi-metal (2:1)-based magnetic charcoal |
|---|---|---|---|
| Arsenic removal rate/% | 75.1 | 85.1 | 92.3 |
| Cadmium removal rate/% | 76.6 | 88.6 | 93.9 |

4. Adsorption Performances of the Layered Multi-Metal-Oxide-Based Magnetic Biochar for Arsenic and Cadmium Under Preparation Conditions of Different Metal Selections and Ratios The layered multi-metal-oxide-based magnetic biochar in Examples 10-14 was weighed for 0.2500 g each, placed in a 50 mL conical flask, and added with 25 mL of As(III)/Cd (II) mixed solution with a concentration gradient of 10-250 $mg \cdot L^{-1}$; the pH of the solution was adjusted to 4.5; the solution was oscillated at a constant speed of 150 $r \cdot min^{1}$ at room temperature for 8 h, and then centrifuged and separated; the supernatant was filtered; the arsenic content was measured with an atomic fluorescence spectrometer; the cadmium content was measured by inductively coupled plasma emission spectrometry; and the adsorption capacity was calculated based on a difference from an initial concentration; and each treatment was repeated three times.

The layered multi-metal-oxide-based magnetic biochar in Examples 10-14 was weighed for 0.2500 g each, placed in a 50 mL conical flask, and added with 25 mL of As(III)/Cd (II) mixed solution with a concentration of 100 mg·L$^{-1}$; the pH of the solution was adjusted to 4.5; the solution was oscillated at a constant speed of 150 r/min at room temperature for 8 h, and then centrifuged and separated; the supernatant was filtered; the arsenic content was measured with an atomic fluorescence spectrometer; the cadmium content was measured by inductively coupled plasma emission spectrometry; and the adsorption efficiency was calculated in combination with an initial concentration; and each treatment was repeated three times. The adsorption capacity results were shown in Table 6, and the adsorption efficiency was shown in Table 7.

As shown in Table 6 and Table 7, the adsorption effects of pre-impregnated calcium magnesium-based, calcium aluminum-based and magnesium aluminum-based magnetic charcoal on arsenic and cadmium are not as good as that of calcium magnesium aluminum-based magnetic charcoal, indicating that a calcium magnesium aluminum-based compound scheme has the best promotion effect of the layered multi-metal-oxide-based magnetic biochar on arsenic and cadmium adsorption. According to Table 6 and Table 7, the adsorption capacities of the calcium magnesium aluminum-based magnetic charcoal for arsenic and cadmium are 65%-107% and 71%-123% higher than those of the calcium magnesium-based, calcium aluminum-based and magnesium aluminum-based magnetic charcoal, confirming the above conclusion. The removal rate results show similar conclusions. In addition, the adsorption capacity of the pre-impregnated calcium magnesium aluminum-based magnetic charcoal for arsenic and cadmium is 26%-42% higher than that of post-impregnated calcium magnesium aluminum-based magnetic charcoal, and the removal rate is increased by more than 10%, indicating that the treatment method of iron salt pre-impregnation is an optimal scheme to improve the adsorption capacity of the layered multi-metal-oxide-based magnetic biochar for arsenic and cadmium.

TABLE 6

| Biochar | Heavy metals | Arsenic and cadmium content in solutions with different concentrations/mg · L$^{-1}$: 10 | 20 | 30 | 50 | 70 | 100 | 150 | 200 | 250 | Adsorption capacity/ mg · g$^{-1}$ |
|---|---|---|---|---|---|---|---|---|---|---|---|
| Calcium aluminum-based pre-impregnated magnetic charcoal | As(III) | 1.0 | 3.70 | 4.2 | 8.40 | 16.88 | 43.01 | 88.35 | 134.86 | 162.78 | 98.03 |
| | Cd(II) | 1.36 | 3.08 | 3.50 | 19.45 | 15.09 | 31.90 | 65.78 | 100.07 | 101.88 | 101.66 |
| Magnesium aluminum-based pre-impregnated magnetic charcoal | As(III) | 2.54 | 4.89 | 5.79 | 9.10 | 17.86 | 52.80 | 82.03 | 135.07 | 166.63 | 91.33 |
| | Cd(II) | 2.22 | 4.41 | 4.13 | 10.48 | 16.29 | 32.13 | 67.44 | 104.32 | 111.88 | 92.82 |
| Calcium magnesium-based pre-impregnated magnetic charcoal | As(III) | 1.03 | 2.51 | 2.07 | 7.42 | 12.22 | 22.50 | 55.03 | 89.98 | 92.01 | 114.58 |
| | Cd(II) | 1.10 | 2.35 | 2.60 | 8.34 | 12.84 | 26.07 | 54.46 | 88.60 | 92.10 | 120.17 |
| Calcium magnesium aluminum-based post-impregnated magnetic charcoal | As(III) | 1.85 | 2.49 | 3.31 | 6.76 | 15.90 | 36.63 | 67.57 | 86.83 | 196.23 | 145.35 |
| | Cd(II) | 1.61 | 3.13 | 3.79 | 6.24 | 11.32 | 23.56 | 44.41 | 64.58 | 66.82 | 186.82 |
| (1:3) molar ratio calcium magnesium aluminum-based pre-impregnated magnetic charcoal | As(III) | 2.86 | 3.59 | 4.66 | 7.72 | 18.44 | 38.02 | 70.22 | 89.36 | 199.58 | 132.01 |
| | Cd(II) | 2.26 | 4.02 | 4.89 | 7.56 | 15.22 | 25.52 | 47.63 | 68.60 | 72.85 | 170.35 |

TABLE 7

| Biochar type | Calcium aluminum-based pre-impregnated magnetic charcoal | Magnesium aluminum-based pre-impregnated magnetic charcoal | Calcium magnesium-based pre-impregnated magnetic charcoal | Calcium magnesium aluminum-based post-impregnated magnetic charcoal | (1:3) molar ratio calcium magnesium aluminum-based pre-impregnated magnetic charcoal |
|---|---|---|---|---|---|
| Arsenic removal rate/% | 61.2 | 52.3 | 69.3 | 75.6 | 71.3 |
| Cadmium removal rate/% | 65.3 | 53.6 | 72.9 | 80.5 | 78.9 |

In Table 6 and Table 7, except for the calcium magnesium-based pre-impregnated magnetic charcoal in a mass ratio of 1:3, which has a molar ratio of trivalent metals to divalent metals of 1:3, a molar ratio of trivalent metals to divalent metals in other layered multi-metal-oxide-based magnetic biochar is 3:1, which corresponds to this example.

5. Immobilization Effect of the Layered Multi-Metal-Oxide-Based Magnetic Biochar on Arsenic and Cadmium in Soil (1) Soil sample for testing: the test soil was taken from contaminated farmland soil around a site in Dalian, Liaoning. The collected soil samples were naturally air-dried and sieved with a 2 mm sieve before use. 100 g of soil was taken and sieved with a 0.149 mm sieve, and relevant indicators are determined according to conventional soil agrochemical analysis methods. The basic physical and chemical properties of soil are that: the total arsenic content was 178.75 $mg \cdot kg^{-1}$, the $NaHCO_3$ extracted arsenic content was 8.56 $mg \cdot kg^{-1}$, and the total cadmium content was 8.12 $mg \cdot kg^{-1}$. The pH value was 8.02, the organic matter content was 47.66 $g \cdot kg^{-1}$, and the cation exchange capacity was 15.96 $cmol \cdot kg^{-1}$. In the mechanical composition of soil, the particle size of 2.0-0.2 mm accounted for 51.51%, the particle size of 0.2-0.02 mm accounted for 40.99%, and the particle size of 0.02-0.002 mm accounted for 7.50%.

(2) Soil culture test 100 g of air-dried soil sample which was sieved with a 2 mm sieve was weighed and placed into a 250 mL beaker; and the original biochar, the magnetic biochar and the layered multi-metal-oxide-based magnetic biochar in Examples 6-13 were applied to soil (using blank soil as a control) according to a mass fraction ratio of 3%, mixed evenly, added with a certain amount of ultrapure water to make the water content reach 70% of the field water capacity, and cultured in a constant temperature and humidity chamber with a temperature of 25° C. and a humidity of 70%. Each treatment was repeated three times. Water was replenished by a constant weight method to maintain 70% of the field water capacity for cultivation. Samples were taken when the culture test was carried out for 30 days, and the toxic leaching content of arsenic and cadmium in the soil was extracted using a TCLP method.

(3) Test indicators: a TCLP toxicity leaching experiment was as follows: 500 mL of acetic acid extract with a pH of 2.88 was prepared from glacial acetic acid, 1 g of soil was added to 20 mL of acetic acid extract and shaken for 18 h, then centrifuged, filtered and diluted, and the solution content was measured on a machine.

Research results: the analysis results of a TCLP toxic leaching experiment for arsenic and cadmium show that when the culture test is carried out for 30 days, the TCLP leaching content of arsenic in soil added with the layered multi-metal-oxide-based magnetic biochar decreases significantly, and the passivation efficiency of arsenic and cadmium in soil is more than 85%. However, the toxic leaching content of arsenic and cadmium in the soil treated with the original biochar is high. Therefore, the application of the layered multi-metal-oxide-based magnetic biochar greatly reduces the toxic leaching content of arsenic and cadmium in the soil, thereby effectively fixing active arsenic and cadmium in the soil.

It is stated that the present invention illustrates the detailed structural features of the present invention through the above embodiments, but the present invention is not limited to the above detailed structural features, that is, it does not mean that the present invention must rely on the above detailed structural features to be implemented. Those skilled in the art should understand that any improvements to the present invention, equivalent replacements of the selected components of the present invention, addition of auxiliary components, selection of specific modes, etc., all fall within the protection scope and disclosure scope of the present invention.

The preferred embodiments of the present invention have been described in detail above. However, the present invention is not limited to the specific details of the above embodiments. Within the scope of the technical concept of the present invention, a variety of simple modifications can be made to the technical solutions of the present invention. These simple modifications all belong to the protection scope of the present invention.

In addition, it should be noted that each of the specific technical features described in the above-mentioned specific embodiments can be combined in any suitable manner without conflict. In order to avoid unnecessary repetition, the present invention does not specify various possible combinations.

In addition, any combination may be made between various embodiments of the present invention, and as long as it does not contradict the idea of the present invention, and shall likewise be regarded as the contents disclosed in the present invention.

What is claimed is:

1. A preparation method of a layered multi-metal-oxide-based magnetic biochar, the preparation method comprising:

S1. mixing biomass and an iron salt solution for impregnation, and then adjusting a first pH value of a solid phase material after solid-liquid separation to obtain a pretreated biomass; and S2. pyrolyzing the pretreated biomass to obtain a magnetic biochar, then mixing the magnetic biochar with a solution containing at least two metal salts and adjusting a second pH value, and then performing hydrothermal treatment to obtain the layered multi-metal-oxide-based magnetic biochar.

2. The preparation method according to claim 1, wherein the biomass comprises any one or a combination of at least three of wheat straw, rice husk, bamboo chips, sludge or garlic, bamboo chips and garlic; and wherein the biomass has a particle size of 60~100 meshes.

3. The preparation method according to claim 1, wherein the iron salt solution comprises a mixed solution of ferrous iron and ferric iron;

wherein a molar ratio of the ferrous iron to the ferric iron in the iron salt solution is (1-4):1; and wherein a mass ratio of the biomass to an iron salt used in preparing the iron salt solution is (0.5-3):1.

4. The preparation method according to claim 1, wherein a stirring speed during the impregnation is 300-1000 revs/min; and a stirring time during the impregnation is 4-48 h.

5. The preparation method according to claim 1, wherein an end point of the first pH value adjustment is that the pH value of a solid phase material is 6.5-7.5.

6. The preparation method according to claim 1, wherein the pyrolysis is performed at a temperature of 400-800° C.; and wherein the pyrolysis is performed for 1-6 h.

7. The preparation method according to claim 1, wherein metal ions in the solution containing at least two metal salts comprise a combination of at least two of magnesium ions, aluminum ions, iron ions or calcium ions;

wherein a molar ratio of trivalent metal ions to divalent metal ions in the solution containing at least two metal salts is (1-4):1; and wherein a solid-liquid ratio g/mL of the magnetic biochar to the solution containing at least two metal salts is 1:(1-20).

8. The preparation method according to claim 1, wherein the second pH value is adjusted to adjust the pH value of the solution to 8-10;

wherein the hydrothermal treatment is to evaporate the materials to dryness using a hydrothermal method; and wherein the evaporation to dryness is performed at a temperature of 80-110° C.

* * * * *